(12) United States Patent
Mukherjee

(10) Patent No.: US 8,375,082 B2
(45) Date of Patent: Feb. 12, 2013

(54) COMMUNICATIONS SYSTEMS AND METHODS

(75) Inventor: Debargha Mukherjee, San Jose, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 3305 days.

(21) Appl. No.: 10/418,533

(22) Filed: Apr. 17, 2003

(65) Prior Publication Data

US 2004/0215722 A1     Oct. 28, 2004

(51) Int. Cl.
*G06F 15/16* (2006.01)
(52) U.S. Cl. ......... 709/204; 709/228; 709/231; 715/751
(58) Field of Classification Search .................. 709/204; 715/751
See application file for complete search history.

(56) References Cited

U.S. PATENT DOCUMENTS

| | | | |
|---|---|---|---|
| 5,537,408 A | | 7/1996 | Branstad et al. |
| 5,671,225 A | | 9/1997 | Hooper et al. |
| 5,712,906 A | | 1/1998 | Grady et al. |
| 5,796,394 A | * | 8/1998 | Wicks et al. .................. 715/751 |
| 5,802,283 A | | 9/1998 | Grady et al. |
| 6,157,401 A | * | 12/2000 | Wiryaman ................. 348/14.09 |
| 6,343,313 B1 | * | 1/2002 | Salesky et al. ................ 709/204 |
| 6,487,600 B1 | * | 11/2002 | Lynch ........................... 709/229 |
| 6,507,865 B1 | * | 1/2003 | Hanson et al. .............. 705/36 R |
| 6,633,324 B2 | * | 10/2003 | Stephens, Jr. .............. 348/14.09 |
| 7,023,465 B2 | * | 4/2006 | Stephens, Jr. .............. 348/14.09 |

OTHER PUBLICATIONS

"Structured Content Independent Scalable Meta-formats (SCISM) for Media Type Agnostic Transcoding"; Mukherjee et al.; Imaging Systems Laboratory, HP Laboratories; Aug. 2002; pp. 1-26.
"Proposals for end-to-end Digital Item Adaption using Structured Scalable Meta-formats (SSM)"; Mukherjee et al.; HP Laboratories; Oct. 2002; pp. 1-78.

\* cited by examiner

*Primary Examiner* — April Shan

(57) ABSTRACT

Collaboration session communications methods, methods of configuring a plurality of collaboration sessions, communications methods, collaboration infrastructures, and communications systems are described. According to one aspect, a collaboration session communications method includes coupling a plurality of groups of participants with a collaboration infrastructure, providing a plurality of communications rules to the collaboration infrastructure to control communications of data within a collaboration session, outputting a communication from a first one of the groups for communication to a second one of the groups, receiving the communication within the collaboration infrastructure after the providing, identifying the communication as originating from the first one of the groups and intended for communication to the second one of the groups, and forwarding the communication to a third one of the groups using the collaboration infrastructure and responsive to the identifying and in accordance with one of the communications rules.

14 Claims, 5 Drawing Sheets

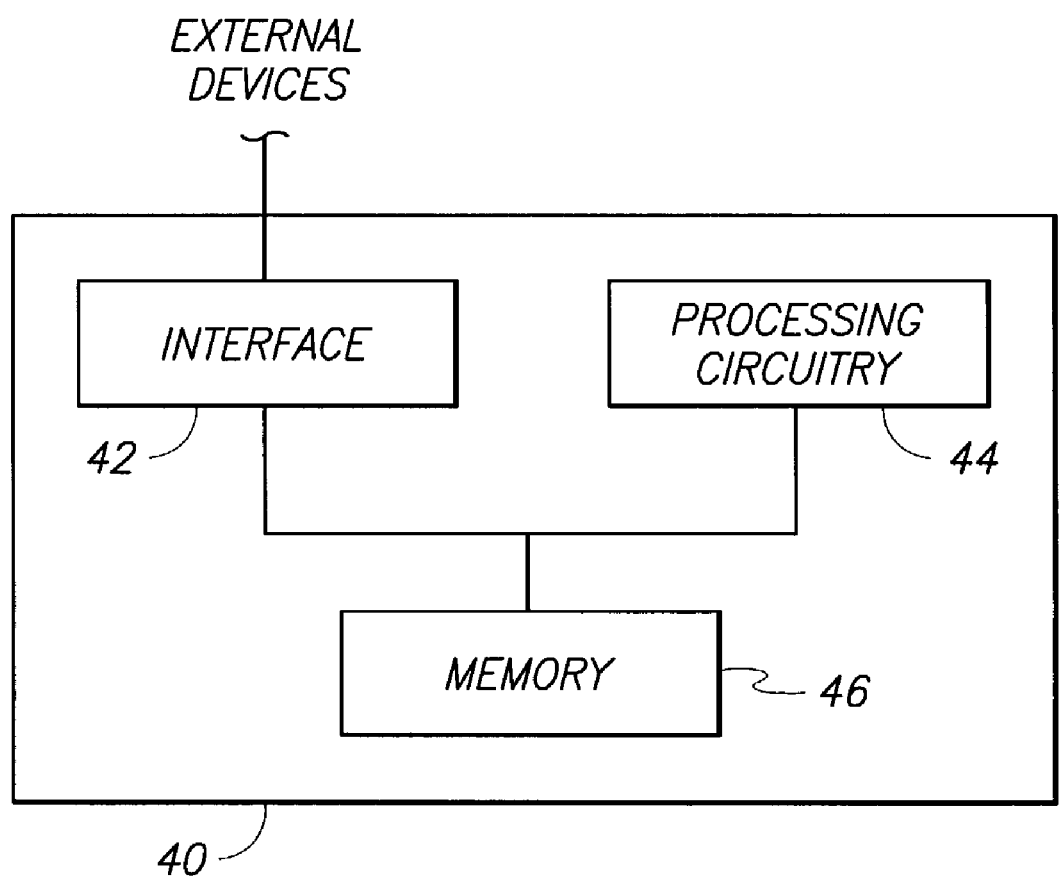

US 8,375,082 B2

COMMUNICATIONS SYSTEMS AND METHODS

FIELD OF THE INVENTION

Aspects of the invention relate to collaboration session communications methods, methods of configuring a plurality of collaboration sessions, communications methods, collaboration infrastructures, and communications systems.

BACKGROUND OF THE INVENTION

Collaboration or collaborative sessions, including multimedia collaboration, are being utilized in an increasing number of applications to facilitate exchange of data and information. In an exemplary collaboration scenario, a group of entities communicates over the Internet and exchanges information and media to achieve a specific goal. While initial applications of collaboration sessions included text-based "Chat" and control-based "Network Games," more recent applications provide exchange of bandwidth intensive media in collaborative sessions. The main goal of collaboration sessions includes the exchange of data (including different types of data) between the participants of a session.

Different collaborative applications have different requirements for data flow between participants. For example, a group discussion application may need every participant to know what another participant is communicating. In contrast, a distance learning application would enable teacher(s) to talk to all or any students, but students should be allowed to talk only to teacher(s) to ask questions. Other arrangements or applications having other rules for data flow are possible.

In some arrangements, participants log into a server or server network which is configured to implement the communication of data between the participants. Rules are specified which control the flow of data based upon the type of collaboration session. Different server infrastructures are arranged to accommodate different collaboration applications. The use of different server infrastructures for respective collaboration applications has associated drawbacks inasmuch as the infrastructures may be relatively focused, inflexible devices which may not be easily configured for other types of applications.

Aspects of the present invention provide apparatus and methods for improving communications in collaboration sessions.

SUMMARY OF THE INVENTION

Aspects of the invention relate to communication of data (e.g., digital data) between a plurality of users or participants. Exemplary aspects include collaboration session communications methods, methods of configuring a plurality of collaboration sessions, communications methods, collaboration infrastructures, and communications systems.

According to one embodiment, a collaboration session communications method comprises coupling a plurality of groups of participants with a collaboration infrastructure and providing a plurality of communications rules to the collaboration infrastructure to control communications of data within a collaboration session. The method also includes outputting a communication from a first one of the groups for communication to a second one of the groups, and receiving the communication within the collaboration infrastructure after the providing. The method provides identifying the communication as originating from the first one of the groups and intended for communication to the second one of the groups, and forwarding the communication to a third one of the groups using the collaboration infrastructure and responsive to the identifying and in accordance with one of the communications rules.

According to another embodiment of the invention, a collaboration infrastructure comprises an interface configured to receive a plurality of sets of different collaboration rules, and processing circuitry configured to implement communications intermediate a plurality of participants during a plurality of collaboration sessions. Programming is also provided configured to control the processing circuitry to access the sets of different collaboration rules for respective ones of the collaboration sessions, and to control the processing circuitry to identify, for individual ones of communications of the collaboration sessions, a sending participant of the communication and to forward the communication to an appropriate recipient participant corresponding to the respective collaboration rules for the respective collaboration session.

Other embodiments and aspects are disclosed.

DESCRIPTION OF THE DRAWINGS

FIG. 14 is a functional block diagram of an exemplary server according to one embodiment.

DETAILED DESCRIPTION OF THE INVENTION

Aspects of the invention provide configurable collaboration infrastructures of increased flexibility that minimize the utilization of different infrastructures for different or new collaborative applications. The communications rules may be easily modified to accommodate a wide range of configurations and applications. Enforcement of communications rules at the infrastructure, such as a server, as opposed to individual participant machines, provides collaboration sessions of increased security, streamlining of collaborative work in progress, and automatic archival of content. Furthermore, if bandwidth intensive media content to be exchanged is provided in a scalable encoding format or a meta-format then the infrastructure can perform appropriate transcoding to suit the capabilities and preferences of end participants enabling heterogeneous collaboration. Scalable encoding formats and meta-formats are described in "Proposals for End-To-End Digital Item Adaptation Using Structured Scalable Meta-Formats (SSM)," listing Debargha Mukherjee, Geraldine Kuo, Amir Said, Girodano Beretta, Sam Liu, and Shih-ta Hsiang as authors, (published October, 2002), the teachings of which are incorporated herein by reference. In such an exemplary paradigm, collaboration is provided even if end participants have diverse bandwidths, processing powers, display resolutions, etc.

At least some aspects of the invention provide a methodology for specifying data communications rules for routing content during respective multipoint collaboration sessions which may include multimedia collaboration. Configurable collaboration infrastructures are proposed in one embodiment. Dynamic configuration of collaboration infrastructures is provided in one embodiment such that multipoint sessions can be configured based on the routing requirements of the applications (e.g., games, text-based chat, media exchange, etc.) concerned.

Figure 1:
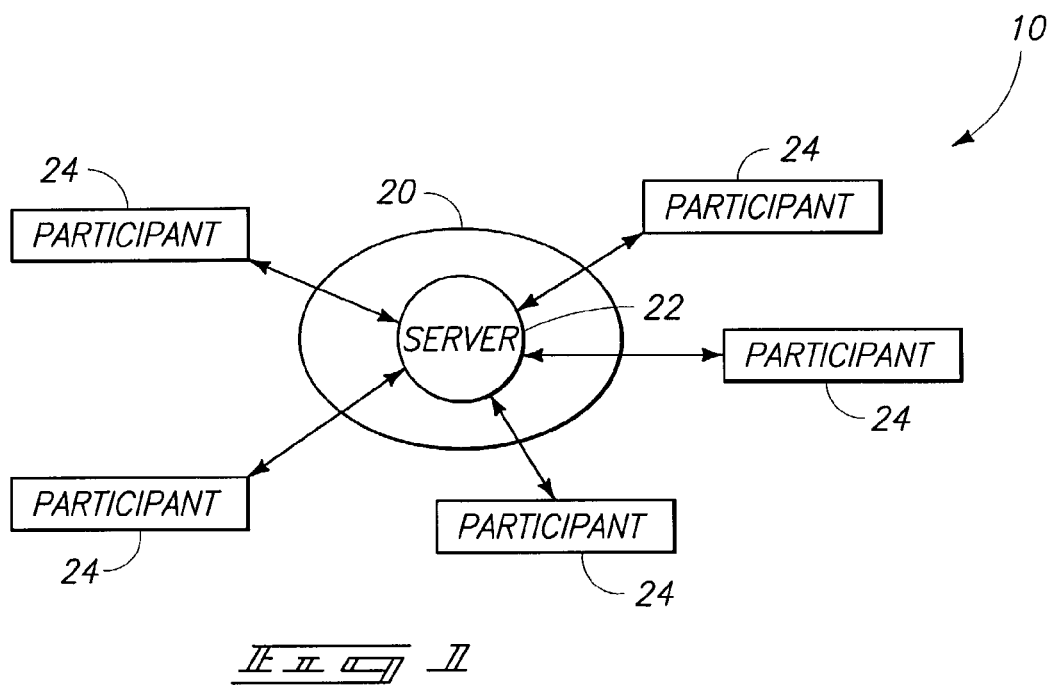
FIG. 1 is an illustrative representation of a first exemplary collaboration infrastructure according to one embodiment.
Figure 2:
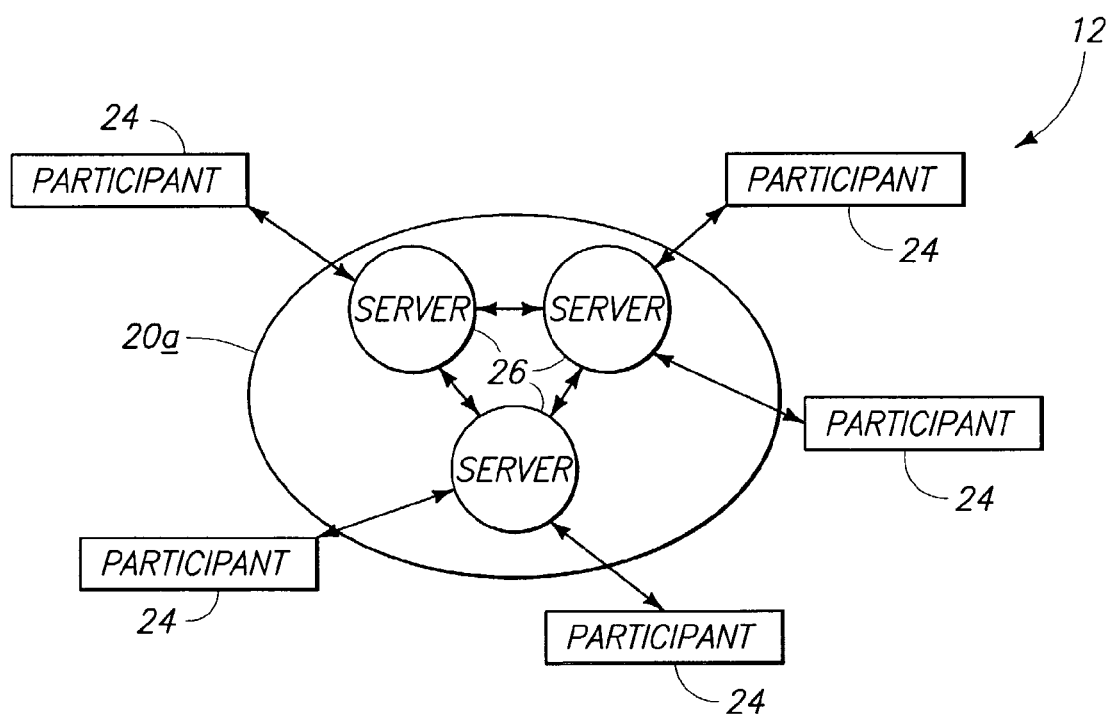
FIG. 2 is an illustrative representation of a second exemplary collaboration infrastructure according to one embodiment.

Referring to FIGS. 1 and 2, a plurality of exemplary collaboration sessions are respectively depicted as reference characters 10, 12 which use a plurality of respective communications systems. Collaboration session refers to data communications within a communications system between a plurality of participants or users. In one more specific exemplary embodiment, collaboration session refers to a multipoint meeting where two or more individual participants communicate by exchange of any information, data, or media concurrently in order to achieve a specific goal.

The collaboration session 10 of FIG. 1 includes a collaboration infrastructure 20 of an exemplary communications system which comprises a single server 22 in one embodiment. A plurality of participants 24 are coupled with server 22 of collaboration infrastructure 20. The collaboration session 12 of FIG. 2 includes a collaboration infrastructure 20a of an exemplary communications system which comprises a plurality of servers 26 in one embodiment. The servers 26 of collaboration infrastructure 20a are arranged in an exemplary peer-to-peer network model in the depicted exemplary configuration. In one embodiment, collaboration infrastructure 20a is implemented as a true peer-to-peer network wherein the servers 26 are symmetric and have equal rights. During communications, participants 24 connect to a respective one of the servers 22, 26 in the respective collaboration infrastructures 20, 20a, and the topology may dynamically change during the course of the collaborative sessions 10, 12 as described below.

Accordingly, in one embodiment, models for organizing collaborative sessions 10, 12 include server-based models for exchanging and/or routing data. Instead of communicating directly with each other, individual participants 24 of collaboration sessions 10, 12 communicate with the appropriate collaboration infrastructures 20, 20a.

Advantages of server-based collaboration sessions 10, 12 include improved enforcement of security since data is sent and received through the respective collaboration infrastructures 20, 20a. In addition, servers of collaboration infrastructures 20, 20a may be configured to provide automatic archival capability (i.e., since content is routed through the servers). Further, dependence on capabilities of participants 24 is minimized since bandwidth available to individual participants 24 and servers 22, 26 is typically not stressed. Servers 22, 26 may be coupled using high-speed connections, and for scalable media content, servers 22, 26 may transcode or adapt high bandwidth content appropriately to suit the capabilities and preferences of participants 24, thereby allowing heterogeneous collaboration. For example, servers 22, 26 may transcode data from one format to another format. Other arrangements of collaboration infrastructures 20, 20a apart from servers are possible and may include workstations, routers, etc.

Exemplary embodiments of the present invention provide configurable collaboration infrastructures 20, 20a. According to one embodiment, collaboration infrastructures 20, 20a may be configured or tailored to specific collaborative applications to provide flexibility to accommodate the needs of participants 24. In one embodiment, the appropriate collaboration infrastructure 20, 20a may be provided in a plurality of different configurations at a plurality of different moments in time to implement a plurality of different collaboration sessions.

In one embodiment, reconfiguration of the collaboration infrastructures 20, 20a may include providing different communications rules which control the communications intermediate participants 24 during the collaboration session communications. Communications rules may also be referred to as configuration rules and exemplary communications rules specify whether individual participants 24 are able to output communications (i.e., transmission capabilities), and if so, which participants receive such communications (i.e., routing of transmissions). Further details regarding specification and application of communications rules are described below.

Configuration protocols may be implemented in the application layer of the 7-layer OSI model, similar to HTTP, FTP, Gopher etc., to permit, in at least one embodiment, collaboration applications of participants 24 to configure the respective collaboration infrastructure 20, 20a appropriately for different semantic collaboration requirements. Further details regarding implementation of configuration protocols are described in Dimitri P. Bertsekas and Robert Gallagher, *Data Networks*, (Prentice-Hall, 1992), the teachings of which are incorporated by reference.

In one arrangement, a collaboration application of a participant 24 may configure a multipoint collaborative session using an Application Programming Interface (API). Participants 24 may cause the configuration (e.g., communications rules) to be provided or conveyed to the respective collaboration infrastructure 20, 20a using relevant protocols. Thereafter, data flow through the respective collaboration infrastructures 20, 20a for collaborative sessions 10, 12 is controlled in accordance with the respective communications rules specified.

Collaboration infrastructures 20, 20a may run respective distributed processes to manage and route data during respective collaboration sessions 10, 12. The distributed processes running on the collaboration infrastructures 20, 20a may be referred to as session organizers and exemplary details of such processes are described in Maarten Van Steen, Andrew S. Tanenbaum, *Distributed Systems: Principles and Paradigms*, (Prentice-Hall 2002), the teachings of which are incorporated by reference. Configurable collaboration infrastructures 20, 20a can simultaneously serve different collaboration applications with widely varying data flow requirements in one embodiment.

As mentioned previously, collaborative sessions 10, 12 with specified properties can be configured using configurable collaboration infrastructures 20, 20a based on application specific requirements. In one embodiment, collaborative sessions 10, 12 may be configured remotely either at the start of the respective session or prior to the start of the respective session by specifying the communications rules in one embodiment.

Exemplary models are described for usage, session configuration and registration as described below. In one possible model, one of the participants 24 of individual ones of the collaboration sessions 10, 12 may be referred to as a session creator and arranged to configure and start respective collaborative sessions 10, 12. Session information, such as password(s), session time, session name, etc., may be conveyed by respective creator participants 24 to a list of invitee participants 24 prior to sessions 10, 12, for example, using email. Then, at the specified time, the creator participants 24 actually connect to the respective server 22, 26 in the respective collaboration infrastructure 20, 20a, and configure and start the respective collaboration sessions 10, 12.

The configurations may include providing respective communications rules described above. As mentioned above, the collaboration infrastructures 20, 20a create respective distributed processes (i.e., session organizers) running on the servers 22, 26 of the respective collaboration infrastructures 20, 20a to manage the respective collaboration sessions 10, 12. Once the respective collaboration sessions 10, 12 are created, the invitee participants 24 join the appropriate collaboration sessions 10, 12 by connecting to a respective server 22, 26 using specified parameters. The respective session organizers authenticate incoming connection requests from participants 24, and admit them into the respective sessions 10, 12. While collaborative sessions 10, 12 are in progress, participants 24 exchange information using communications rules previously specified. Once the collaboration sessions 10, 12 have reached logical conclusions, the respective session creators terminate the respective collaboration sessions 10, 12 which causes distributed session organizer objects to be discarded, and individual participants 24 to be disconnected.

In a first exemplary model, the session creators assign the passwords for the participants 24. The session creators may enjoy special powers, for example, the session creators can communicate with any participant 24 in the respective collaboration sessions 10, 12 while other configuration rules may only apply to other participants 24.

In a second exemplary model, respective collaboration sessions 10, 12 are pre-registered at the respective collaboration infrastructures 20, 20a by the session creator at a time earlier than the actual session times. The session creators provide the appropriate communications rules to the respective collaboration infrastructures 20, 20a. At registration time, the session creators specify the password(s), collaboration session names, collaboration session times, etc. The session creators can also specify an email list of invitee participants 24 and the collaboration infrastructures 20, 20a can automatically send invitation emails to the appropriate participants 24. At the collaboration session times specified, the collaboration infrastructures 20, 20a create distributed session organizer objects automatically to organize the respective collaboration sessions 10, 12. At the end of the time specified or when it is logical to conclude the collaboration sessions 10, 12, the session organizer objects are discarded and the respective collaboration sessions 10, 12 are terminated. The session creators do not have to be present while the respective collaboration sessions 10, 12 are in progress, but they can participate if needed since they know the session password(s). The session creators may also specify an administration password with which they can change certain characteristics [e.g., start and end times, etc.] of the respective collaboration sessions 10, 12 after registration, or while the collaboration sessions are in progress.

In a third exemplary model, collaboration sessions 10, 12 may be pre-registered but the session creators do not specify the password(s). The creators may specify a list of emails of potential participants and appropriate communications rules for the potential participants. The respective collaboration infrastructures 20, 20a may automatically generate appropriate password(s), and send the collaboration session names, times and password information to the potential participants provided. The session creator cannot participate in the collaboration sessions unless he is also one of the recipients of the collaboration session information. The session creator may still have certain administrative privileges with administration passwords.

Besides the three exemplary models mentioned above, a variety of other models are possible by mixing and matching the described concepts. In accordance with exemplary embodiments of the invention, the session creators have the ability in session applications to configure the communications rules in the respective collaboration infrastructures 20, 20a depending on the application specific requirements, or other criteria.

In one embodiment, a plurality of different groups of participants 24 having different transmission and/or receiving capabilities are supported within a single one of collaboration sessions 10, 12 in order to support a wide variety of collaborative applications. A subset of participants 24 that have common transmission and reception capabilities in the same collaboration session may be referred to as a participant group. Creation of participant groups (e.g., individual groups may have one or more individual participant 24) is described below followed by an illustration of communications rules which are conveyed to the appropriate server infrastructure 20, 20a in accordance with the groups of participants 24. The collaboration infrastructures 20, 20a are configured to enforce the communications rules during communications of participants 24.

In one embodiment, participant groups may be automatically created by multi-tier passwords. When a collaborative session 10, 12 is registered or created, the following information may be sent by the session creator to the respective collaboration infrastructures 20, 20a: a number of participant groups, a name of individual participant groups, passwords for respective individual participant groups, maximum numbers of participants in the groups (may be unlimited), and communications rules (e.g., transmission and routing) for participant groups with respect to one another.

In one embodiment, there are as many passwords in individual collaborative sessions 10, 12 as there are participant groups. An email sent to invitee participants 24 may contain only one password corresponding to the group they are supposed to join. Accordingly, assigning of passwords to participants 24 operates to assign the participants 24 to respective groups in one embodiment. In exemplary embodiments, passwords may be enforced manually by the session creator, or handled automatically by the session organizer, depending on the model being utilized. As participants 24 join an individual collaborative session 10, 12 based on the password provided, they may be automatically associated with the correct group. In some arrangements, participant groups may individually have a limit on the maximum number of participants as mentioned above. The session organizer may stop accepting new connections in a group once the limit is reached.

Once participants 24 are placed within the appropriate respective groups, they may exchange data and media through the respective collaboration infrastructures 20, 20a in accordance with the communications rules specified for the respective groups. Accordingly, a wide variety of collaborative applications may be supported by adjusting the communications rules. Exemplary communications rules and specification of communications rules are described below.

Communications rules may be specified in the form of a matrix, also referred to as a set. Communications rules are configured to control communications of participants 24 within the collaboration infrastructures 20, 20a and collaboration sessions 10, 12. The communications rules may be and typically are different for different collaboration sessions. Accordingly, the communications rules may be configured to configure the collaboration infrastructures 20, 20a differently for different collaboration sessions 10, 12 at different moments in time.

According to one embodiment, if there are N participant groups in an individual communications session 10, 12, and G denotes the set of all groups, the communications rules may be specified in a N×N matrix R, where element $R_{ij}$ specifies the rules for communication from group i participants 24 to group j participants 24 as shown in Matrix A. Element $R_{ij}$ is comprised of two items $\{b_{ij}, L_{ij}\}$, where $b_{ij}$ is a binary symbol ($b_{ij} \in \{0, 1\}$), and $L_{ij}$ is any subset of participant groups in the session ($L_{ij} \subseteq G$). If transmission is allowed ($b_{ij}=1$), a group i participant 24 can send communications to any group j participant 24, otherwise not ($b_{ij}=0$). $L_{ij}$ is null if transmission is not allowed ($b_{ij}=0$), but if allowed ($b_{ij}=1$), the subset $L_{ij}$ specifies a list of groups as a whole to which the same data or message also reaches in addition to the targeted recipient. In one embodiment, all participants 24 of the groups specified in the group recipient list $L_{ij}$ receive the same data, when any group i participant sends data to any group j participant(s). Using appropriate group recipient lists, even if $b_{ij}=0$, it may be possible for a group i participant 24 to send data to a group j recipient if there are recipient participants 24 from other groups.

|  | Group 1 | Group 2 | ... | Group N |
| --- | --- | --- | --- | --- |
| Group 1 | $R_{11} = \{b_{11}, L_{11}\}$ | $R_{12} = \{b_{12}, L_{12}\}$ | | $R_{1N} = \{b_{1N}, L_{1N}\}$ |
| Group 2 | $R_{21} = \{b_{21}, L_{21}\}$ | $R_{21} = \{b_{22}, L_{22}\}$ | | |
| . | | | | |
| . | | | $R_{ij} = \{b_{ij}, L_{ij}\}$ | |
| . | | | | |
| Group N | $R_{N1} = \{b_{N1}, L_{N1}\}$ | | | $R_{NN} = \{b_{NN}, L_{NN}\}$ |

$$b_{ij} \in \{0, 1\}$$

$$L_{ij} \begin{cases} = \phi, & \text{if } b_{ij} = 0 \\ \subseteq G, & \text{if } b_{ij} = 1 \end{cases}$$

G is the set of all participant groups

Matrix A

Accordingly, as described above, the appropriate collaboration infrastructure 20, 20a, may receive a communication from a first or sender participant 24 and identify the communication as intended for a second or targeted recipient participant 24, and forward the communication to one or more third or additional participant 24 or groups of participants 24 responsive to the identification and in accordance with the communications rules. The communication may be also communicated to the targeted participant 24 or group of participants 24. In at least one configuration, the collaboration infrastructures 20, 20a may forward a communication from a group of participants to another group of participants not indicated in the communication.

In accordance with the communications rules, certain communications may not be forwarded to one or more participant 24 or groups of participants 24 (i.e., groups not in set G for a respective communication) in at least one embodiment. Further, the communications rules may be specified to prohibit communications from a group of participants 24 (e.g., $b_{ij}=0$) as described above. As shown in the exemplary matrix, the communications rules may be utilized to specify different communications within the collaboration infrastructures 20, 20a for the different respective groups. Further, for a given collaboration session, the communications rules for one of the participants 24 or groups of participants 24 may differ from communications rules for another of the participants 24 or groups of participants 24.

A plurality of examples of collaboration sessions 10, 12 are described below. A first example includes a group discussion or chat scenario. In one form, all participants 24 communicate with all other participants 24, but no individual participant 24 may communicate to another specific participant 24 in private. A variant consists of a scenario where participants 24 can communicate with specific participants 24 in the group as well as to all participants 24 as a whole.

Figure 3:
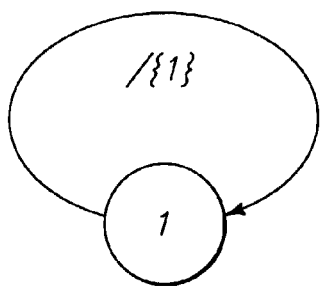
FIG. 3 is a state flow representation of a first exemplary group chat collaboration session according to one embodiment.
Figure 4:
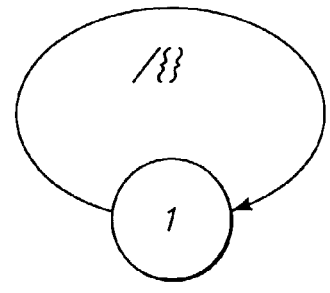
FIG. 4 is a state flow representation of a second exemplary group chat collaboration session according to one embodiment.

The first scenario (private communications not permitted) and second scenario (private communications are permitted) are illustrated in respective Matrices B and C and respective FIGS. 3 and 4. As illustrated, both Matrices B and C include a single participant group called "everybody." In both Matrices B and C, communications between participants 24 of the only group are allowed. In Matrix B and using the above exemplary communications rules formatting, the group recipient list of {1} indicates that if a member of the group sends data to another member, the data also reaches other members of the group (Group 1). In Matrix C, a null group recipient list indicates no specific recipient group is specified, and accordingly, any member of group 1 can send data to all or any specific member in the same group.

Matrix B

|  | Group 1 (Everybody) |
|---|---|
| Group 1 (Everybody) | {1,{1}} |

Matrix C

|  | Group 1 (Everybody) |
|---|---|
| Group 1 (Everybody) | {1,{}} |

Referring now to FIGS. 3 and 4 (which correspond to respective ones of Matrices B and C), alternative state flow type representations are depicted. The FIGS. 3 and 4 include arrows connecting two groups indicating that transmissions are allowed. The group transmission lists are specified as /{ . . . } alongside the arrows.

Figure 5:
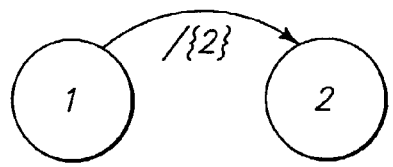
FIG. 5 is a state flow representation of a first exemplary passive presentation collaboration session according to one embodiment.
Figure 6:
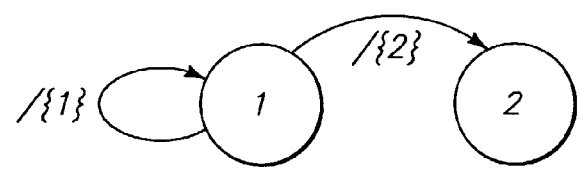
FIG. 6 is a state flow representation of a second exemplary passive presentation collaboration session according to one embodiment.

Referring to Matrices D and E (and FIGS. 5 and 6, respectively), examples are shown of passive presentation where one or more presenter participants present material to passive audience participants who do not have feedback capabilities. The communications rules matrices and the state flow diagrams for both a single presenter participant scenario and plural presenter participants scenario are shown in Matrices D and E, respectively (and FIGS. 5 and 6, respectively).

In either example, a presenter participant sends material to the audience participants as a whole and is not allowed to distinguish between individual audience participants for transmission. The passive audience participants can neither transmit to the presenter participant(s) nor transmit amongst each other. In the plural presenter participant example, whatever a presenter participant transmits to the audience also goes to other presenter participants. Also, the presenter participants can communicate with other presenter participants in a group, though private communications between two presenter participants is not allowed (relevant for more than 2 presenters).

Matrix D

|  | Group 1 (Presenter) | Group 2 (Audience) |
|---|---|---|
| Group 1 (Presenter) | {1,{}} | {0,{2}} |
| Group 2 (Audience) | {0,{}} | {0,{}} |

Matrix E

|  | Group 1 (Presenters) | Group 2 (Audience) |
|---|---|---|
| Group 1 (Presenters) | {1,{1}} | {1,{1, 2}} |
| Group 2 (Audience) | {0,{}} | {0,{}} |

Figure 7:
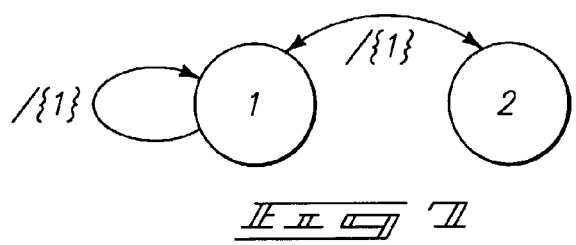
FIG. 7 is a state flow representation of a first exemplary active group presentation collaboration session according to one embodiment.
Figure 8:
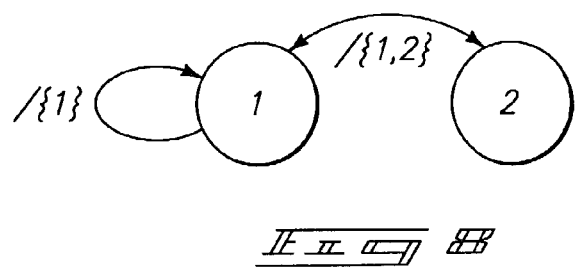
FIG. 8 is a state flow representation of a second exemplary active group presentation collaboration session according to one embodiment.

Referring to Matrices F and G (and FIGS. 7 and 8, respectively), two exemplary active presentation scenarios are shown where audience participants can interact with the presenter participant(s) and ask questions. In both cases, the audience participants can ask questions to the presenter group as a whole. However, in the first example, the questions from audience participants are private and do not go to other audience members. In one implementation of the first example, communications sent from presenter participant(s) to an audience participant are not automatically broadcast to other audience participants to allow presenter participants to respond in private to private questions from specific audience participants. However, in the second example, the questions and answers are public.

Matrix F

|  | Group 1 (Presenters) | Group 2 (Audience) |
|---|---|---|
| Group 1 (Presenters) | {1,{1}} | {1,{1}} |
| Group 2 (Audience) | {1,{1}} | {0,{}} |

Matrix G

|  | Group 1 (Presenters) | Group 2 (Audience) |
|---|---|---|
| Group 1 (Presenters) | {1,{1}} | {1,{1, 2}} |
| Group 2 (Audience) | {1,{1, 2}} | {0,{}} |

Figure 9:
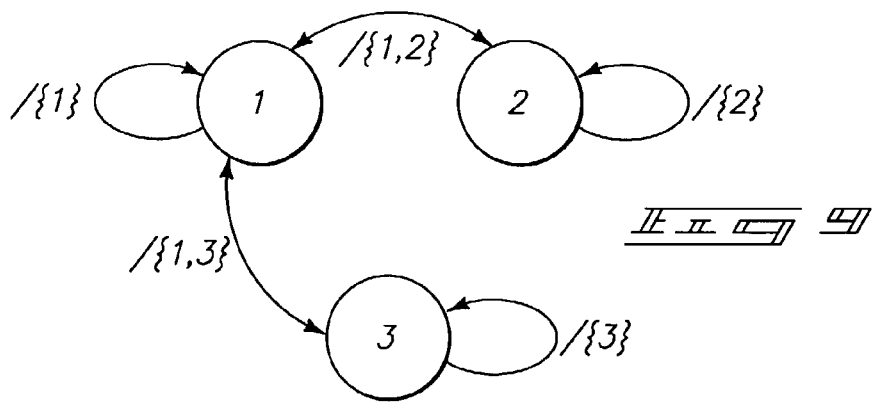
FIG. 9 is a state flow representation of a first exemplary mediated negotiation collaboration session according to one embodiment.
Figure 10:
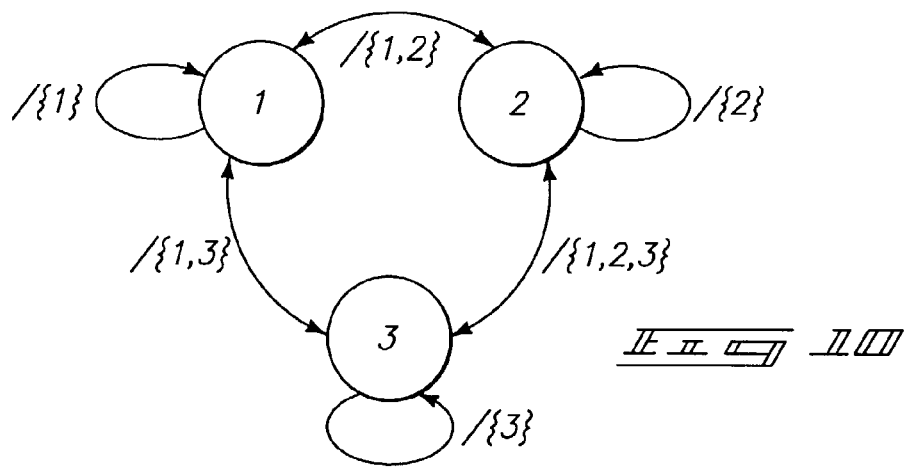
FIG. 10 is a state flow representation of a second exemplary mediated negotiation collaboration session according to one embodiment.

Referring to Matrices H and I (and FIGS. 9 and 10, respectively), two exemplary scenarios are presented wherein parties negotiate/work together to reach a common goal with mediation/supervision from a neutral mediator group. This scenario may be generally called a mediated-negotiation model. In the first example, individual party participants can have intra-party discussions, but they cannot transmit directly to the other party participant. The party participants communicate with the mediator participants, who in turn can transmit to the other group. In the first example, all communication is constrained to be between groups as a whole and no private communication between participants less than the whole group is allowed. In the second example, the party participants can directly transmit to each other, but any inter-party communication reaches all participants of both parties as well as the mediator participants.

Matrix H

|  | Group 1 (Mediators) | Group 2 (Party 1) | Group 3 (Party 2) |
|---|---|---|---|
| Group 1 (Mediators) | {1,{1}} | {1,{1, 2}} | {1,{1, 3}} |
| Group 2 (Party 1) | {1,{1, 2}} | {1,{2}} | {0,{}} |
| Group 3 (Party 2) | {1,{1, 3}} | {0,{}} | {1,{3}} |

Matrix I

|  | Group 1 (Mediators) | Group 2 (Party 1) | Group 3 (Party 2) |
|---|---|---|---|
| Group 1 (Mediators) | {1,{1}} | {1,{1, 2}} | {1,{1, 3}} |
| Group 2 (Party 1) | {1,{1, 2}} | {1,{2}} | {1,{1, 2, 3}} |
| Group 3 (Party 2) | {1,{1, 3}} | {1,{1, 2, 3}} | {1,{3}} |

Figure 11:
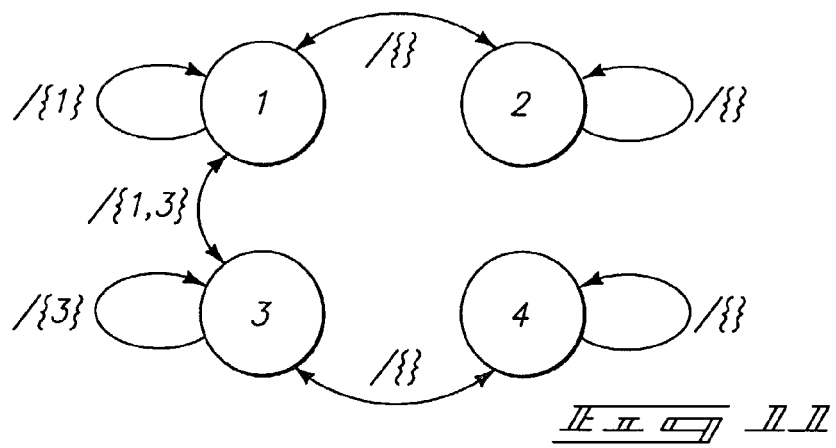
FIG. 11 is a state flow representation of an exemplary collaboration session comprising a plurality of teams according to one embodiment.

Referring to Matrix J (and FIG. 11), an exemplary scenario is presented wherein where two or more teams are individually led by one or more leader and work in parallel to achieve a desired task (e.g., leaders 1 lead team 1 and leaders 2 lead team 2). This scenario may be generally referred to as a teamwork model. There are four groups illustrated in the example (i.e., two for the team members and two for the team leaders). The team participants collaborate amongst themselves and their respective leaders by public or private communications. The leader participants can have public or private communication to participants in their respective team. Further, they can communicate in public and private amongst each other as a group, and also communicate with leader participants of the other team as a group. When leader participants of two teams transmit to each other, the communication is made open to leader participants of both teams in the depicted example.

The above scenarios illustrate exemplary embodiments. The communications rules may be tailored to provide other desired scenarios corresponding to the participant applications.

Collaboration infrastructures 20, 20a implement communications of the respective collaborative sessions 10, 12 according to respective sets of communications rules. In an exemplary configuration using a single server (e.g., server 22 of FIG. 1), the single server 22 organizes the collaborative session 10 (i.e. runs an organizer process) and communications are routed through server 22. Server 22 further operates to block some communications when appropriate or expand the list of recipients for appropriate communications in accordance with the group communications rules.

Figure 12:
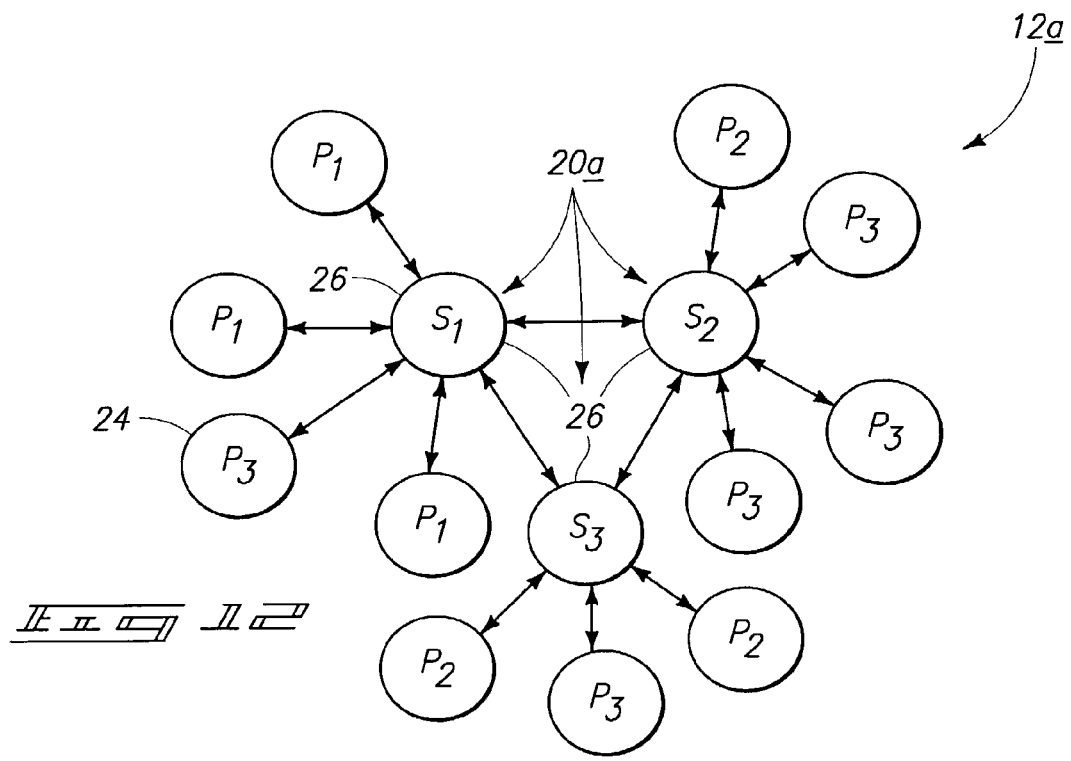
FIG. 12 is an illustrative representation of a third exemplary collaboration infrastructure according to one embodiment.
Figure 13:
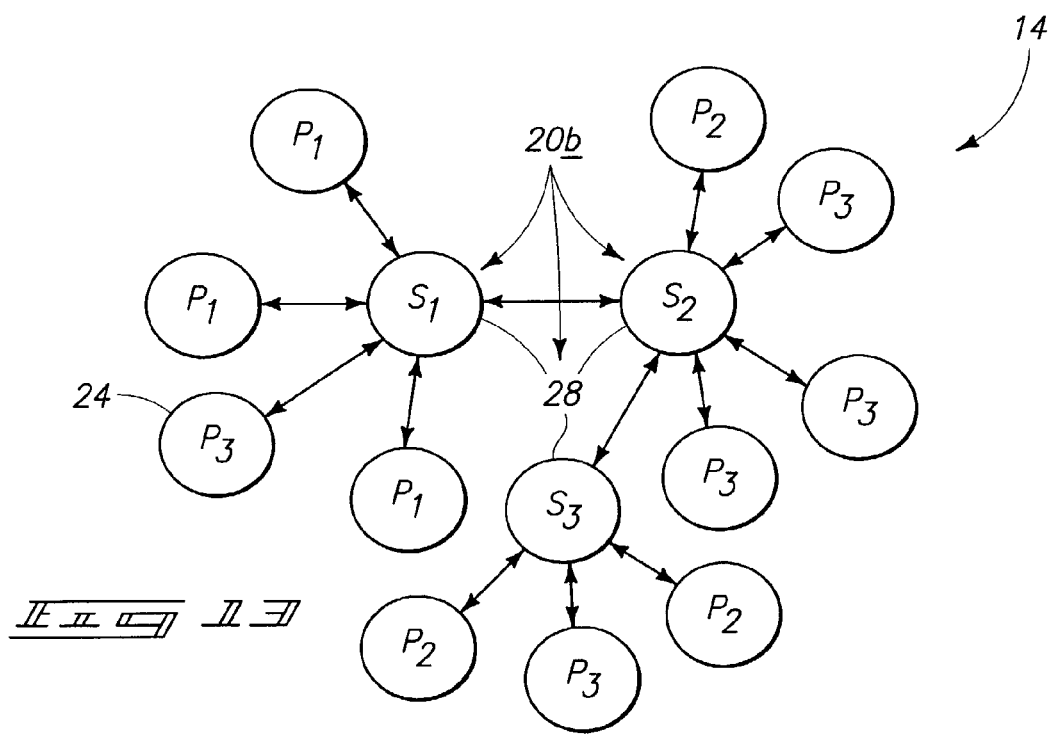
FIG. 13 is an illustrative representation of a fourth exemplary collaboration infrastructure according to one embodiment.

Referring to configurations using a plurality of servers (e.g., servers 26 of FIG. 2), individual participants 24 are distributed amongst different servers 26 with individual participants 24 connecting to a single one of the servers 26 in the exemplary embodiment. Referring to FIGS. 12 and 13, an exemplary fully interconnected collaboration infrastructure 20a for a collaboration session 12a and an exemplary peer-to-peer collaboration infrastructure 20b comprising a plurality of servers 28 for a collaboration session 14 are respectively illustrated. FIGS. 12 and 13 depict exemplary collaboration sessions 12a, 14 individually including three respective servers 26, 28 ($S_1$, $S_2$ and $S_3$) and running distributed organizer processes to conduct communications intermediate three groups of participants 24 (groups are indicated by P1, P2 and P3). The participants 24 are arbitrarily connected to the servers 26, 28 of the respective collaboration sessions 12a, 14. In exemplary arrangements, the organizer components in individual servers 26, 28 have knowledge of the actual network-topologies of the respective collaboration infrastructures 20a, 20b in order to route messages appropriately.

In exemplary arrangements, participants 24 of the collaboration sessions 12a, 14 individually have a unique identifier, individual groups have respective unique identifiers, and individual servers 26, 28 have respective unique identifiers in individual collaboration sessions 12a, 14. The organizer components of individual servers 26, 28 have additional information to route content in one embodiment.

For example, organizer components of individual servers 26, 28 may include application specific information regarding the collaboration applications. For example, a participant-to-group map may be included comprising a table that maps participant identifiers to respective group identifiers. In one embodiment, this may be obtained from the passwords for the participants 24 provided at the time of joining a session. Additional information includes the respective communications rules matrices which may be independent of actual network topology and connectivity of the collaboration sessions 12a, 14.

The organizer components may include additional information regarding the collaboration applications such as network topology and connectivity specifics of the collaboration sessions 12a, 14. A participant-to-Internet Protocol (IP) address map may be provided which maps individual identifiers of participants to respective IP addresses. In one embodiment, these maps differ between the individual servers 26, 28 (e.g., maps may only contain information for participants 24 that are directly connected to the respective servers). Participant-to-server maps may be provided that map, for individual participants 24, the identifier of the participant 24 to an identifier of the server 26, 28 it is directly coupled with. Further, a server-to-server map may be provided. In one example, this map may be a 2-dim table that shows how to reach a server $S_j$ from a server $S_i$ in a peer-to-peer or other collaboration infrastructure. In one arrangement, the individual servers 26, 28 are fully connected in a high-speed connection (e.g., FIG. 12) and reaching any server 26 from any other server 26 utilizes a single hop transmission. However, if that is not the case (e.g., FIG. 13 wherein servers $S_1$ and $S_3$ are not directly connected) the server-to-server map may provide more specific information regarding the actual collaboration infrastructure involved. For example, this can be a matrix whose $(ij)^{th}$ entry shows the identifier of the next server to which a message must be forwarded if $S_j$ is to be reached from $S_i$.

The above-described application specific information relates to the application specific definition of groups and communications rules in respective collaborative sessions. The above-described network topology and connectivity specific information relate to actual network topologies of the collaboration infrastructures. It may be possible to optimize the participant-to-server maps and server-to-server maps dynamically based on factors such as bandwidth available for individual communication links, the bandwidth usage pattern for individual participants 24, a participant-to-group map, communications rules, or other criteria. In one example, a single controller node (e.g., one of the servers) may be provided in a collaboration infrastructure that gathers information from the servers and makes topology reconfiguration operations if desired. In exemplary collaboration sessions, a participant may be handed over to a different server from the one the participant was previously connected to if that is found to provide improvement from a performance point of view (e.g., bandwidth). For example, the controller node of the collaboration infrastructure may analyze a communication received from a participant and analyze the communication to determine if reconfiguration is appropriate. As the handover occurs, the participant-to-server map may be updated accordingly on all servers. If it is necessary and possible to change the server connectivity, then the server-to-server map may also be updated dynamically while a collaboration session is in progress. For servers arranged in a fully connected peer-to-peer network, and the participant-to-server map may be the only item changed for dynamic updating. Accordingly, the collaboration infrastructure may analyze a communication and reconfigure the infrastructure (e.g., handing over communications from a participant 24 to a different server) responsive to the analysis in at least one embodiment.

Referring to FIG. 14, an exemplary server 40 is depicted. Servers 22, 26, 28 may be implemented using server 40 in exemplary configurations. Server 40 includes an interface 42, processing circuitry 44 and memory 46.

Interface 42 is configured to bi-directionally communicate with external devices, such as participants or other servers. In one arrangement, interface 42 receives sets of different collaboration rules from participants which may be used to configure respective collaboration sessions.

Processing circuitry 44 may be implemented as a microprocessor configured to execute programming (e.g., executable instructions such as firmware and/or software, communications rules including values b, L mentioned above, or any other digital information) to control communications and other operations of server 40. In one embodiment, the processing circuitry 44 is configured to implement communications intermediate a plurality of participants during a plurality of collaboration sessions. In accordance with the described embodiment, the programming may be configured to control the processing circuitry 44 to access sets of different collaboration rules (e.g., from memory 46) for respective ones of the collaboration sessions. For example, the programming may control the processing circuitry 44 to identify, for individual ones of communications of the collaboration sessions, a sending participant of the communication and to forward the communication to an appropriate recipient participant corresponding to the respective collaboration rules for the respective collaboration session.

Memory 46 may be arranged in any desired configuration to store digital data, including programming, communications, communications rules, and maps in exemplary arrangements. Exemplary memory 46 includes ROM, RAM, flash, and disk drives (e.g., hard, optical, floppy, etc.).

A discussion regarding a total number of bits utilized to implement configurable collaboration infrastructures according to one example follows. According to the above-described embodiments, $N^2$ different entries $R_{ij}$ are provided if there are N groups and individual entries may use one bit for the $b_{ij}$ component of the exemplary communications rules. The list $L_{ij}$ of the exemplary communications rules utilizes N-bits assuming one bit per group to specify whether the group exists in $L_{ij}$ or not. Thus, in one embodiment, N+1 bits are used for individual entries, bringing the total number of bits used to $N^2$ (N+1). The result can be expressed in bytes by taking a ceiling function ceil[$N^2$(N+1)/8]. Two bytes are used for N=2, 5 bytes for N=3, 10 bytes for N=4, 19 bytes for N=5, 32 bytes for N=6, 49 bytes for N=7, and so on. It follows that aspects described above may be implemented with minimal overhead in at least one embodiment.

Utilization of raw bits may constitute the most economical way of specifying communications rules. When considering interoperability, it may be more convenient to use an XML based language to configure the collaboration infrastructures for a particular session of a given collaborative application. An exemplary syntax for an XML based description follows:

```
<SESSION>
  <SESSION_NAME id= "xxxxx">session_name</SESSION_NAME>
  .......
  <GROUPS>
    <GROUP_ITEM grpid=
    "group_id_1">group_name_1</GROUP_ITEM>
    <GROUP_ITEM grpid=
    "group_id_2"> group_name_2</GROUP_ITEM>
    .............
    <GROUP_ITEM grpid=
    "group_id_N">group_name_N</GROUP_ITEM>
  </GROUPS>
  <TX_RULES>
    <TX_RULE_ITEM from_grpid="group_id_i" to_grpid=
    "group_id_j">
      <GROUP_TX_LIST>
        <GROUP_TX_ITEM grpid = "group_id_p" />
        <GROUP_TX_ITEM grpid = "group_id_q" />
        .................
      </GROUP_TX_LIST>
    </TX_RULE_ITEM>
    <TX_RULE_ITEM from_grpid="group_id_k" to_grpid=
    "group_id_l">
```

-continued

```
      <GROUP_TX_LIST>
        <GROUP_TX_ITEM grpid = "group_id_r" />
        <GROUP_TX_ITEM grpid = "group_id_s" />
        .................
      </GROUP_TX_LIST>
    </TX_RULE_ITEM>
    ....................
  </TX_RULES>
</SESSION >
```

In the above XML example, the communications rules are comprised by identification of the groups, in the <GROUPS> tag, followed by the specification of the communications rules in the <TX_RULES> tag. <GROUP_ITEM> tags within <GROUPS> specify the identifying group names, and associate individual groups with respective unique numeric identifiers through the grpid attribute. <TX_RULES> contain a sequence of communications rule items in the <TX_RULE_ITEM> tags which contain one non-zero entry $R_{ij}$ from the rules matrix, with the attributes from_grpid and to_grpid specifying the identifiers of the source and destination groups, i.e. effectively i and j. Thus, from_grpid and to_grpid contain entries specified as the grpid in the <GROUP_ITEM>s above in the described example. Non-zero $R_{ij}$ entries are specified in the example. If an entry $R_{ij}$ is not specified in any <TX_RULE_ITEM>, it may be assumed to be {0, $\phi$} in one implementation. The very occurrence of <TX_RULE_ITEM> with the from_grpid (i) and to_grpid (j) attributes indicate $b_{ij}$=1. The group transmission list $L_{ij}$ is specified using the <GROUP_TX_LIST> tag. The identifiers of groups in list $L_{ij}$ are specified with multiple <GROUP_TX_ITEM> tags within <GROUP_TX_LIST>, using their grpid attribute in the illustrated example.

Considering the multitude of types of collaborative scenarios that exist today and will evolve in the future, it is quite impractical to have different service infrastructures built for different collaborative applications. This problem has motivated greater focus on peer-to-peer models, even though the models may result in more complex implementations that are in general harder to manage and maintain. At least some embodiments of the invention enable specification of collaboration session configurations and data flow rules in a universal and economical manner.

The protection sought is not to be limited to the disclosed embodiments, which are given by way of example only, but instead is to be limited only by the scope of the appended claims.

What is claimed is:

1. A collaboration session communications method comprising:
    coupling a plurality of groups of participants with a collaboration infrastructure;
    providing a plurality of communications rules to the collaboration infrastructure to control communications of data within a collaboration session;
    outputting a communication from a first one of the groups for communication to a second one of the groups;
    receiving the communication within the collaboration infrastructure after the providing;
    identifying the communication as originating from the first one of the groups and intended for communication to the second one of the groups; and
    forwarding the communication to a third one of the groups using the collaboration infrastructure and responsive to the identifying and in accordance with one of the communications rules.

2. The method of claim 1 further comprising forwarding the communication to the second of the groups using the collaboration infrastructure.

3. The method of claim 1 wherein the forwarding comprises forwarding the communication to less than all of the groups.

4. The method of claim 1 wherein the communications rules comprise rules which correspond to respective ones of the groups and are configured to control the collaboration infrastructure to prohibit communications from the participants of at least one of the groups.

5. The method of claim 1 further comprising analyzing the communication, and reconfiguring the collaboration infrastructure responsive to the analyzing.

6. The method of claim 5 wherein the analyzing is after the outputting.

7. The method of claim 5 further comprising providing the collaboration infrastructure comprising a plurality of servers, and wherein the reconfiguring comprises handing over a participant from one server to an other server.

8. The method of claim 1 further comprising providing the collaboration infrastructure comprising a collaboration infrastructure comprising at least one server.

9. The method of claim 1 further comprising transcoding the communication using the collaboration infrastructure and before the forwarding.

10. A collaboration infrastructure comprising:
an interface configured to receive a plurality of sets of different collaboration rules;
processing circuitry configured to implement communications intermediate a plurality of participants during a plurality of collaboration sessions; and
programming configured to control the processing circuitry to access the sets of different collaboration rules for respective ones of the collaboration sessions, and to control the processing circuitry to identify, for individual ones of communications of the collaboration sessions, a sending participant of the communication and to forward the communication to an appropriate recipient participant that is not indicated in the communication.

11. The infrastructure of claim 10 wherein the processing circuitry additionally forwards the communication to a plurality of recipient participants of a group.

12. The infrastructure of claim 10 wherein the processing circuitry additionally forwards the communication to less than all of the participants of a respective collaboration session.

13. The infrastructure of claim 10 wherein the programming configures the processing circuitry to prohibit communications from at least one of the participants.

14. The infrastructure of claim 10 wherein the participants are associated with one of a plurality of groups for individual ones of the collaboration sessions and the communications rules of one of the groups differ from the communications rules of the an other of the groups for individual ones of the collaboration sessions.

* * * * *

UNITED STATES PATENT AND TRADEMARK OFFICE
CERTIFICATE OF CORRECTION

| | |
|---|---|
| PATENT NO. | : 8,375,082 B2 |
| APPLICATION NO. | : 10/418533 |
| DATED | : February 12, 2013 |
| INVENTOR(S) | : Debargha Mukherjee |

It is certified that error appears in the above-identified patent and that said Letters Patent is hereby corrected as shown below:

In the Claims:

In column 16, line 26, in Claim 14, before "an" delete "the".

Signed and Sealed this
Fourteenth Day of May, 2013

Teresa Stanek Rea
*Acting Director of the United States Patent and Trademark Office*